United States Patent
Parsons, Jr.

[11] Patent Number: 5,133,174
[45] Date of Patent: Jul. 28, 1992

[54] HYDRAULICALLY DRIVEN MOWING UNIT

[76] Inventor: Ralph L. Parsons, Jr., 1795 Olmstead Rd., West Jefferson, Ohio 43162

[21] Appl. No.: 646,974

[22] Filed: Jan. 28, 1991

[51] Int. Cl.$^5$ .................... A01D 34/54; A01D 34/60; A01D 69/03; A01D 75/30

[52] U.S. Cl. ........................................ 56/6; 56/7; 56/10.9; 56/11.9; 56/13.6; 56/15.2; 56/17.2; 56/DIG. 10; 56/DIG. 11

[58] Field of Search .............. 56/6, 7, 10.9, 13/5, 56/13/6, 14.9, 15.7, 15.9, 17.2, 11.9, 12.7, 15.2; 456/DIG. 10, DIG. 11

[56] References Cited

U.S. PATENT DOCUMENTS

| | | | |
|---|---|---|---|
| 3,832,835 | 9/1974 | Hall et al. | 56/11.9 X |
| 3,854,271 | 12/1974 | Aldred | 56/10.9 X |
| 4,135,349 | 1/1979 | Schwertner | 56/6 |
| 4,304,086 | 12/1981 | Stuchl | 56/6 |
| 4,370,846 | 2/1983 | Arnold | 56/6 |
| 4,384,443 | 5/1983 | Hoogstrate | 56/7 |
| 4,442,658 | 4/1984 | Cartner | 56/6 X |
| 4,538,400 | 9/1985 | Hottes | 56/11.8 |
| 4,570,425 | 2/1986 | Carr | 56/11.9 X |
| 4,697,404 | 10/1987 | Brockmeier et al. | 56/6 |
| 4,840,020 | 6/1989 | Oka | 56/6 X |
| 4,854,112 | 8/1989 | Holley et al. | 56/6 |
| 4,858,417 | 8/1989 | Priefert et al. | 56/6 |
| 4,866,917 | 9/1989 | Phillips et al. | 56/7 |
| 4,926,621 | 5/1990 | Torras | 56/6 |

*Primary Examiner*—Stephen J. Novosad
*Attorney, Agent, or Firm*—Sidney W. Millard

[57] ABSTRACT

A mower is propelled along the ground by a tractor and the mower includes three cutting units mounted on a frame. The three cutting units are transversely mounted on the frame to cut in overlapping parallel patterns with each cutting unit being free floating on the frame such that each unit cuts at an elevation controlled by the ground immediately under the cutting unit.

16 Claims, 3 Drawing Sheets

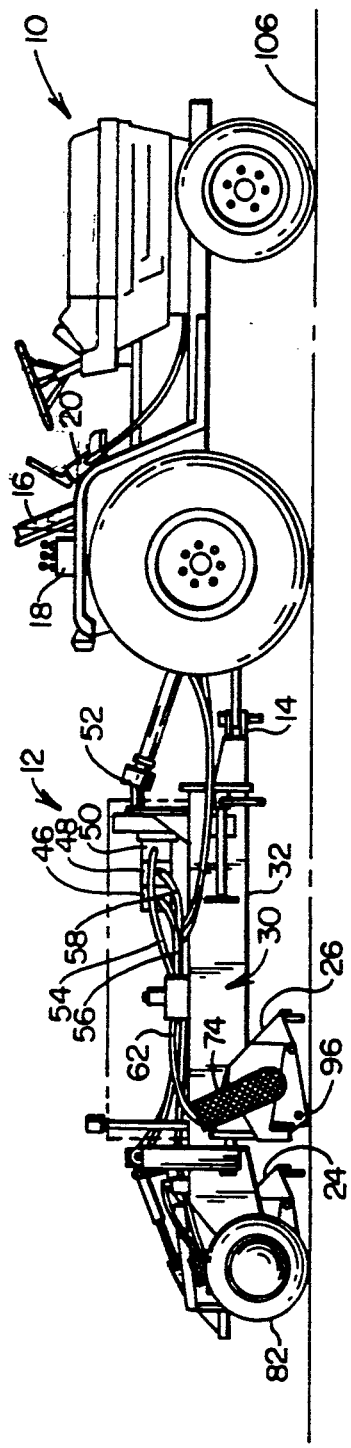

HYDRAULICALLY DRIVEN MOWING UNIT

FIELD OF THE INVENTION

This invention relates to cutting units for cutting vegetation with the units being propelled by a tractor.

BACKGROUND OF THE INVENTION

U.S. Pat. No. 4,135,349 shows an adaptor for use with rotary crop shredders and with a vehicle for towing the shredders. The apparatus includes a center shredder, directly behind the vehicle and shredders on each side of the center one. A center coupling assembly makes connections to the towing vehicle and to the center shredder. Extending from the center coupling assembly to each side shredder is a beam. A side coupling assembly connects each side shredder to the corresponding beam. The positions of the side shredders along the beams can be adjusted for best alignment with planted crop rows. The coupling assemblies, by providing considerable freedom of motion for the shredders, enable the shredders to run over irregular ground. The apparatus includes lifting structure to raise the shredders for transport to and from a field.

U.S. Pat. No. 4,370,846 shows a gang mower having five or seven gangs which are raised and lowered by a single piston and cylinder. Lifting arms are fixed to an actuating shaft at each side of the machine and the piston and cylinder are connected between opposed lifting arms to rotate them in opposite directions. An equalizer link connected by cranks to the actuating shafts ensures that the shafts always rotate to equal extents in opposite directions. Chains are connected from the lifting arms to the mowers, the chains and lifting arms are configured so that lifting occurs sequentially, with some of the mowers being lifted before others. The sequential lifting spreads the load more evenly throughout the lifting sequence, thereby permitting a single piston and cylinder to lift all of the mowers.

U.S. Pat. No. 4,538,400 shows a mower with a translatable main frame connectable to a towing vehicle. The towing vehicle has a rearwardly extending power take-off unit connected to a transmission on the main frame. One frame wing is hinged to one side of the main frame to pivot selectively to a lower cutting position and to an upper, inoperative position. Depending cutter carrying shafts are supported for rotation on the main frame and the wing frame and are driven through the transmission.

U.S. Pat. No. 4,854,112 shows a rotary mower with a front deck and a pair of wing decks. Each wing deck is supported by a lift arm assembly. When the deck is raised from its cutting position to its transport position it rotates so that the mower maintains a relatively low profile. The mower also includes a pair of breakaway assemblies which allow the wing decks to "break away" in the event they strike an immovable object.

U.S. Pat. No. 4,858,417 shows a rotary mower having a central section and end sections. The end sections are mounted to pivot upwardly and downwardly with respect to the central section. Each of the sections includes a plurality of rotary cutting units to provide a horizontal cutting plane across the width of the mower when the end sections are in a lowered mowing position. Each cutting unit is carried on a pneumatic tire wheel. An external drive rotates one of the wheels. The other wheels are mounted in frictional circumferential engagement with each other and the driven wheel so that all wheels are driven in the mowing position. The mower has an adjustable cutting height and is capable of being tilted upwardly as a unit to a vertical position so as to expose all cutting units and wheels for maintenance purposes.

U.S. Pat. No. 4,866,917 shows a self-propelled, triplex mower for golf course greens having two front wheels and a single rear wheel mounted symmetrically relative to a longitudinal center line of the mower. Three mower units are mounted to the mower frame to cut grass ahead of each of the wheels. These mower units are offset so as to be located non-symmetrically relative to the center line with the offset being a distance equal to at least one-half the width of the wheels. Because of this offset, it is necessary only to reverse the mower direction for performing consecutive perimeter and cross cutting operations on a green in order to have the wheels follow different paths.

U.S. Pat. No. 4,926,621 shows a towed mower attached by a hitch to a self propelled front mower. The front mower has its own forwardly positioned cutter unit. The towed mower has a centrally disposed frame segment mounting two side frame segments, each segment includes cutting blades that are supported in bat-wing fashion from the central frame segment. The swath cut in the grass by the front mower is straddled by the swaths cut by the blades of the side frame segments of the towed mower.

SUMMARY OF THE INVENTION

This invention includes the combination of a propelling apparatus to drive a mower over ground to cut vegetation with at least three laterally spaced cutting units on a frame, which frame is either pushed or pulled by the propelling apparatus, in this case a tractor.

The cutting units are pivotally mounted on the frame to allow vertical pivoting about a horizontal axis. The pivoting allows the units to float over the ground individually such that the cutting elevation of each cutting unit with respect to the ground immediately under the cutting unit is controlled entirely by the ground elevation, independent of the ground elevation beneath the other cutting units or the wheels supporting the frame.

The frame includes at least one centrally located cutting unit and at least two transversely mounted cutting units with each of the transversely mounted cutting units overlapping the cut of the centrally mounted cutting unit when all cutting units are in operation.

The cutting units may be controlled individually by the operator of the propelling device in at least two aspects. The first aspect is that the operator may actuate the cutting by any one or two or three of the cutting units or deactivate any one or more of the units, as desired. The second control aspect allows the operator to raise any one or more of the cutting units out of cutting position as desired for transportation from one site to another or because of the configuration of the topography being traversed by the cutting units.

Objects of the invention not clear from the above will be understood fully by a review of the drawings and the description of the preferred embodiments which follow.

BRIEF DESCRIPTION OF THE DRAWINGS

FIG. 1 is a side elevational view of the combination of a propelling unit and a mower mounted to the rear of the propelling unit for towing;

FIG. 2 is a top plan view of the combination of FIG. 1;

DESCRIPTION OF THE PREFERRED EMBODIMENTS

Figure 3:
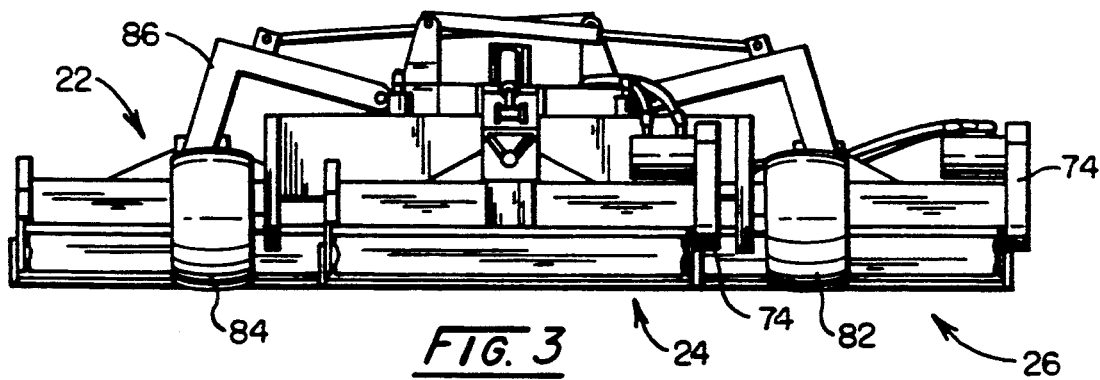
FIG. 3 is a rear elevational view of the mower of FIG. 1 with the cutting units in cutting position.

Looking particularly to FIGS. 1 and 2, a propelling unit or apparatus in the form of a tractor 10 is connected to a mower indicated generally at 12 by a conventional hitch connection 14 which allows the mower to pivot in a horizontal plane as the tractor turns in its usual operations. The tractor propels the mower 12 forward by the longitudinal pull on hitch 14.

The tractor includes the conventional seat 16 for the driver and, as shown in the drawing, two control modules 18 and 20 are located to the driver's right.

Module 18 is shown for illustrative purposes to have three levers and they are to control the starting and stopping of the three illustrated cutters 22, 24, 26.

The mower 12 includes a central frame 28 and mounted on the frame is a T-shaped reservoir 30 to hold hydraulic liquid. The reservoir 30 includes a longitudinal section 32 projecting rearwardly from near the hitch 14 and a transverse sections 34 and 36.

In operation, hydraulic fluid within the reservoir 30 is drawn through a sump exit 38 and feeds into three or more feed lines 40, 42, 44 which connect directly to three or more fluid pumping units 46, 48, 50. The fluid pumping units are driven by a power take-off 52 extending from the rear of the tractor.

Discharge lines 54, 56, 58 lead from fluid pumping units 46, 48, 50 to a set of solenoid valves 60, which are controlled from the control module 18 by the drive of the tractor. The driver may actuate one, two or three of the solenoid valves 60 by the control module 18 and thereby actuate any one or more of the cutters 22, 24, 26.

The cutters are driven by the force of fluid from the solenoid valve console 60 which delivers fluid through lines 62, 64, 66 to fluid drive motors 68, 70, 72 which drive a pulley (not shown). Drive motors 68, 70 and 72 each independently drive a pulley, which in turn drives a V-shaped belt driving another pulley to turn the flails within the hoods 69, 71, 73 serving to cut the vegetation. The pulleys, V-belts, etc. are not shown specifically, but are shown as being housed within a screened housing 74.

Return lines 76, 78, 80 from drive motors 68, 70, 72 return spent fluid to the reservoir. Note that the return lines all lead to different sections of the reservoir and that each one is remote from all of the other return locations and remote from the sump 38 which extracts the fluid from the reservoir. The reason for the locations of the return lines into the reservoir is to cause the fluid to flow within the reservoir to serve as a cooling mechanism to cool the hydraulic fluid to a certain extent before it is again extracted through the sump 38.

The mower has three points of support in the combination of this invention. The first is the hitch 14 and the other two are the transversely located wheels 82 and 84. As will be explained subsequently, the cutters 22, 24, 26 are free floating and are independently pivotable from the frame but provide no mechanical support to the frame itself.

Figure 4:
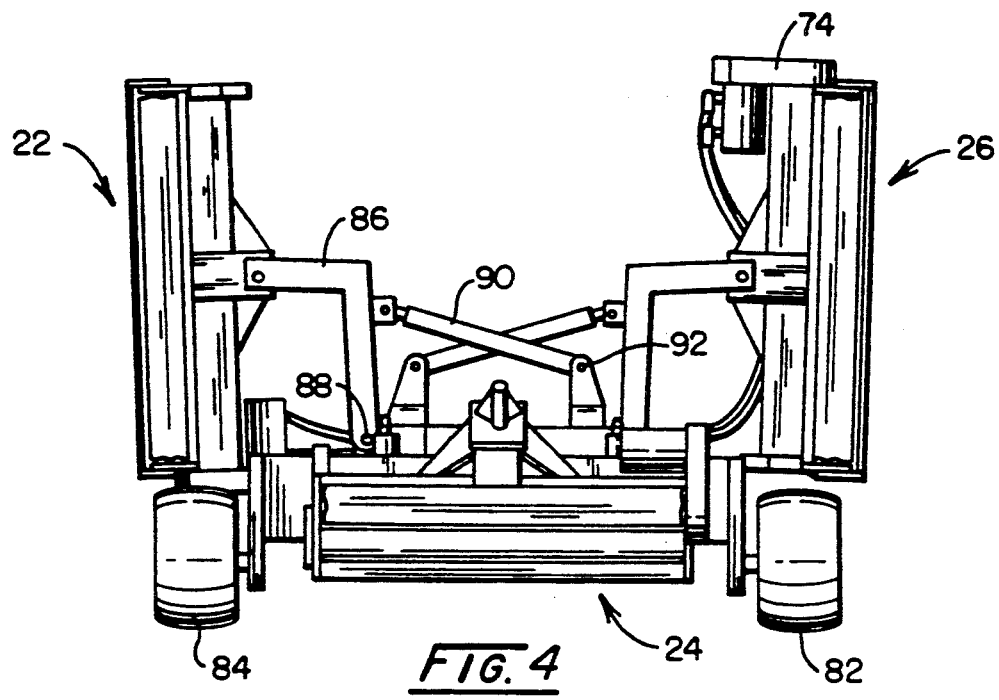
FIG. 4 is a rear elevational view of the mower of FIG. 3 but with the cutting units elevated out of cutting position.

Looking to FIGS. 3 and 4, cutter 22 is supported by a support arm 86 which in turn is connected to the frame at a horizontally aligned pivot pin 88. A piston and cylinder combination 90 connects the support arm 86 to a connection 92 in the form of a bracket pivotally connecting one end of the piston and cylinder combination to the frame. Corresponding structure is shown on the opposite side of the frame for cutting unit 26.

Figure 5:
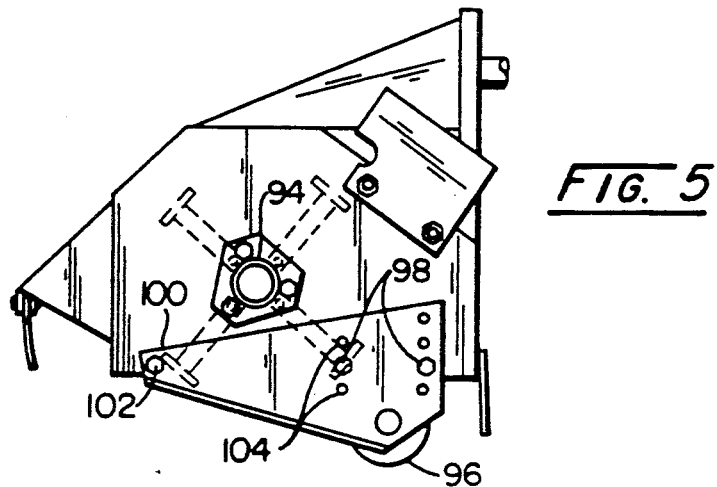
FIG. 5 is a fragmentary side elevational view of an individual cutting unit.

An observation of FIG. 2 will show that cutting unit 24 trails cutting units 22 and 26 on the frame and that the transversely aligned cutters 22 and 26 overlap in their cutting area into the central cutting area of cutter 24. In the preferred embodiment the overlap will be about three inches by each of cutters 22 and 26. The three cutters are all mounted on the frame in a manner where their cutting paths are essentially parallel and, as shown in phantom in FIG. 5, a flail type cutter unit is preferred. Flail units provide a smoother cutting operation and the flail is arranged to rotate in the opposite direction from the rotation of wheels 82, 84. The purpose is to lift the vegetation being cut, sever it, and then chop it up into small pieces as the severed vegetation is pulled up and over the axle 94 of the flail. By operating in this manner, the vegetation will be chopped into such small pieces that it will be unnecessary to sweep or collect the residue.

Each cutter is designed to be supported at a specific elevation above the ground by a roller 96. Wheels 82 and 84 and rollers 96 are designed to roll on the ground as the cutter is propelled forward by the tractor 10. Adjustments in cutting elevation are accomplished by removing bolts 98, raising or lowering support bracket 100 which will pivot about bolt 102 and then reinserting the bolts 98 in different holes 104 to adjust the height of the flail above the ground; thereby the cutting height is controlled by the roller 96.

The piston and cylinder combination 90 are actuated by the driver through actuating module 20 which injects fluid into the cylinder and thereby lifts arm 96 and raise cutter 22 out of engagement with the ground. The module 20 is so arranged that any one, two, or all three of the cutters may be lifted at the discretion of the tractor driver, depending upon the topography being mowed. Upon the deactivation of the piston and cylinder combination 90, the cutter 22 is biased by gravity toward descending and when the pressure in the cylinder piston combination is released, the cutter falls slowly by gravity as the piston squeezes fluid from the cylinder until the roller 96 engages the ground surface 106. Thereby the flail will cut at a designated elevation above the ground level in accordance with the adjustable control of the bracket 100. The cutters are free floating in the sense that the roller 96 will roll on the ground and rise and fall according to the topography being traversed and none of the cutters has any correlation with any of the other cutters as far as the cutting operation is concerned. For example, if there is a bump or raised section on one side of the cutting area, one of the cutters 22 or 26 may be angled upward while the opposite cutter is angled downward and cutter 24 remains horizontal.

It will be observed that piston and cylinder combination 108 connected to the frame and central cutter 24 does not employ a pivot arm 86 as do the side cutters 22 and 26, but other than that, the operations are essentially identical.

Figure 6:
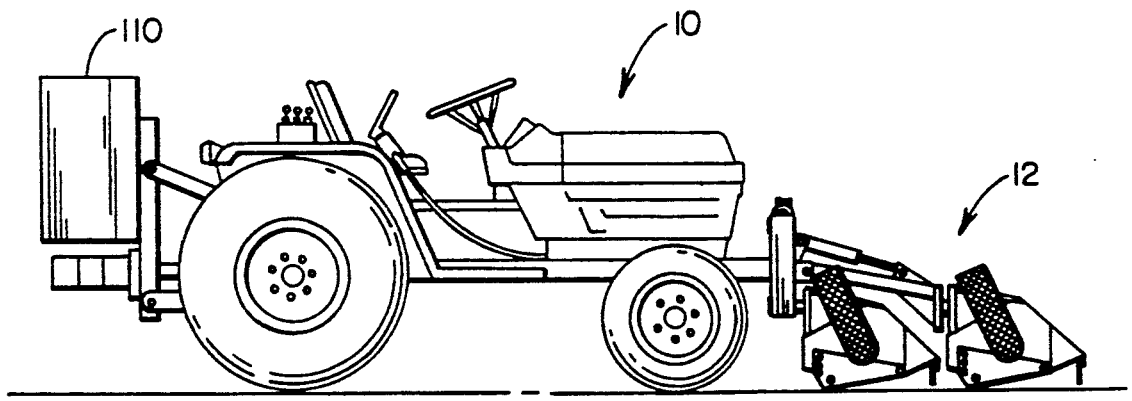
FIG. 6 is a side elevational view of the combination of a propelling unit and a mower, with the mower mounted at the front of the propelling unit to be pushed.
Figure 7:
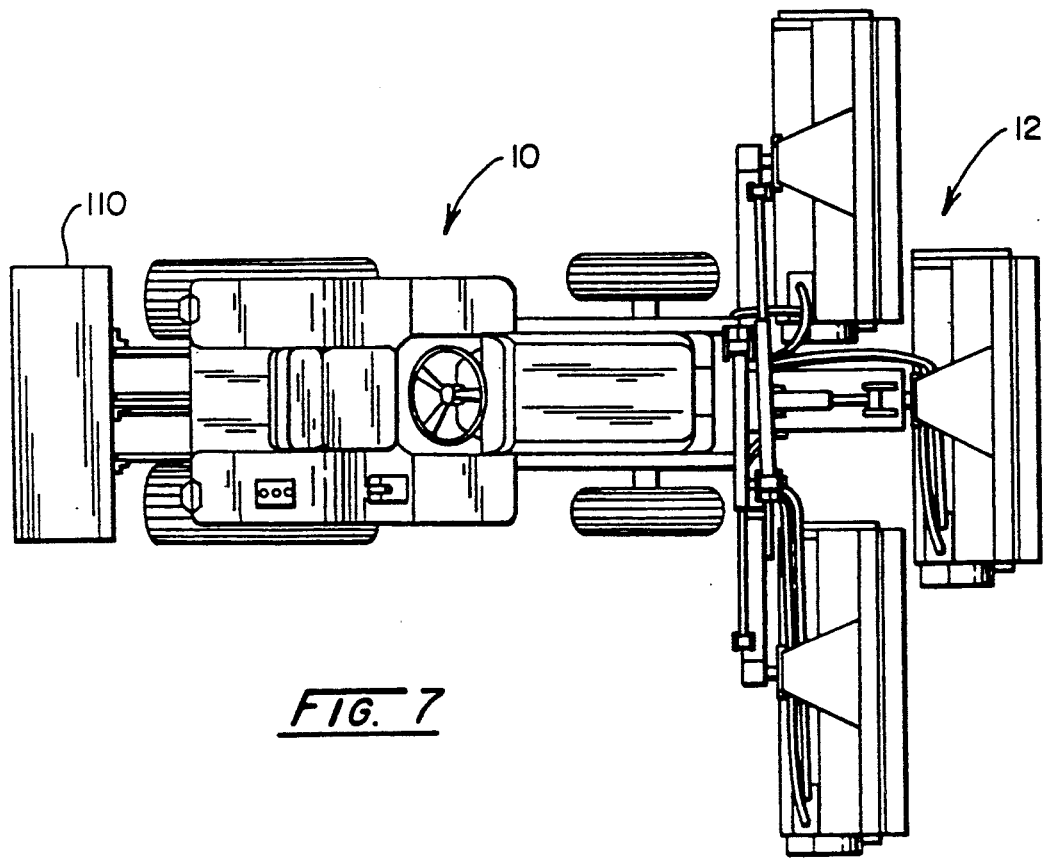
FIG. 7 is a top plan view of the combination of FIG. 6.

FIGS. 6 and 7 illustrate a combination of tractor and mower where the mower is mounted on a frame on the front of the tractor rather than on the rear of the tractor as illustrated in FIGS. 1-5. In the embodiment shown in FIGS. 6 and 7, the reservoir 110 is shown mounted on the rear of the tractor rather than on the frame supporting the cutters on the front of the tractor. The hoses feeding fluid from the reservoir to the cutters and the return, including the solenoid console, fluid motors, etc. are not illustrated because of the number of lines involved, but there is no particular novelty associated with the particular hose arrangement leading from the reservoir to the cutters which is different from what is illustrated in FIGS. 1-5. The arrangement is functionally the same as has been described in relation to FIGS. 1-5.

It will be observed that the cutting heads in both embodiments are structurally mounted to be pushed by the frame. This is in contrast to other mowers having a plurality of cutting heads on a frame which pull the heads. The benefit of the pushing concept is that there is less tendency to tip forward and dig into the ground. It will be noted from the drawings that the force pushing the axles of the cutting heads from behind is parallel with the ground supporting rollers 96 or slightly upwardly inclined. This feature gives the cutting heads greater ability to float over bumps rather than digging into a rise in the ground surface.

Having thus described the invention in its preferred embodiments, it will be clear that modifications may be made to the structure without departing from the inventive concept and such modifications are considered to be within the inventive concept.

Having thus described the invention what is claimed is:

1. In combination, a mower connected to a means for propelling said mower, mower control actuation means on said propelling means and mechanical power take-off means connecting the propelling means to the mower, the combination including, said mower including a frame, at least three cutting units pivotally connected to said frame, said frame including at least two wheels for engaging the ground during mowing operations, said wheels being spaced laterally apart, a fluid reservoir containing a fluid, said reservoir including at least one outlet in fluid communication with at least three feed lines, each of said feed lines being in fluid communication with a fluid pumping unit, each said pumping unit being connected to be driven by said power take-off means, each said driven fluid pumping unit being in fluid communication with one of said feed lines, each of said pumping units having an outlet in fluid communication with a driven fluid motor, one said fluid motor being connected to rotate each of said cutting units, said mower control actuation means including separate means for actuating each driven fluid pumping unit, thereby allowing any one, any two or any three of said cutting units to cut simultaneously, each cutting unit including a fluid return line to receive said fluid from one of the cutting units and return said fluid to said reservoir, said mower control actuation means including means for raising said cutting units vertically out of cutting position, said raising means being connected to said frame and one of said cutting units, there being one raising unit for each cutting unit, thereby allowing any one, any two or any three of said cutting units to be raised out of cutting position.

said reservoir being mounted on said frame, said reservoir having a generally horizontal T-shaped configuration, the reservoir outlet being located near the intersection of the two transversely extending sections of the T, the return lines being connected to the T-shape at the remote ends of the sections of the T.

2. The combination of claim 1 wherein the raising means comprises a piston and cylinder combination, the cylinder being configured to (1) receive fluid to raise the cutting unit out of cutting position and (2) have fluid discharged from the cylinder by the piston by the force of gravity acting on said cutting unit to allow the cutting unit to descend by gravity to cutting position.

3. The combination of claim 2 wherein the cutting units are mounted on the frame to cut in an overlapping pattern when they are in cutting position.

4. The combination of claim 3 including supporting means attached to each cutting unit to engage the ground during cutting and locate the cutting unit at a selected level above the ground, said support means on each unit being configured to allow vertical displacement of its attached cutting unit depending upon the elevation of the ground immediately below the supporting means and independent of the ground elevation immediately below the wheels and the ground elevation immediately below the supporting means attached to other cutting units.

5. The combination of claim 4 wherein at least two of the cutting units are disposed to cut in paths parallel and transverse to a centrally mounted cutting unit, the pivotable connection between the frame and the two transversely located units being configured to increase the cutting overlap with said centrally mounted cutting unit when the ground immediately below any transversely located cutting unit increases or decreases in elevation as compared to the ground immediately below the centrally located cutting unit.

6. The combination of claim 5 including means to individually adjust the cutting height of each cutting unit.

7. The combination of claim 1 wherein the raising means comprises a piston and cylinder combination, the cylinder being configured to (1) receive fluid to raise the cutting unit out of cutting position and (2) have fluid discharged from the cylinder by the piston by the force of gravity acting on said cutting unit to allow the cutting unit to descend by gravity to cutting position.

8. The combination of claim 7 wherein the cutting units are mounted on the frame to cut in an overlapping pattern when they are in cutting position.

9. The combination of claim 1 wherein the cutting units are mounted on the frame to cut in an overlapping pattern when they are in cutting position.

10. In combination, a mower connected to a means for propelling said mower, mower control actuation means on said propelling mean and mechanical power take-off means connecting the propelling means to the mower, the combination including, said mower including a frame, at least three cutting units pivotally connected to said frame, a fluid reservoir containing a fluid, said reservoir including at least one outlet in fluid communication with at least three feed lines, each of said feed lines being in fluid communication with a fluid pumping unit, each said pumping unit being connected to be driven by said power take-off means, each said driven fluid pumping units being in fluid communication with one of said feed lines, each of said pumping units having an outlet in fluid communication with a driven fluid motor, one said fluid motor being connected to rotate each of said cutting units, said mower control actuation means including separate means for actuating each driven fluid pumping unit, thereby allowing any one, any two or any three of said cutting units to cut simultaneously, each cutting unit including a fluid return line to receive said fluid from one of the cutting units and return said fluid to said reservoir, said mower control actuation means including means for raising said cutting units vertically out of cutting position, said raising means being connected to said frame and one of said cutting units, there being one raising unit for each cutting unit, thereby allowing any one, any two or any three of said cutting units to be raised out of cutting position, supporting means attached to each cutting unit to engage the ground during cutting and locate the cutting unit at a selected level above the ground, said support means on each unit being configured to allow vertical displacement of its attached cutting unit depending upon the elevation of the ground immediately below the supporting means and independent of the ground elevation immediately below the wheels and the ground elevation immediately below the supporting means attached to other cutting units.

11. The combination of claim 10 wherein each fluid return line from each cutting unit leads into the reservoir at a location separated from said reservoir outlet and separated from the other return lines.

12. The combination of claim 10 wherein the reservoir is mounted on the rear of the propelling means and the frame is mounted on the front of the propelling means.

13. The combination of claim 10 wherein at least two of the cutting units are disposed to cut in paths parallel and transverse to a centrally mounted cutting unit, the pivotable connection between the frame and the two transversely located unit being configured to increase the cutting overlap with said centrally mounted cutting unit when the ground immediately below any transversely located cutting unit increases or decreases in elevation as compared to the ground immediately below the centrally located cutting unit.

14. The combination of claim 13 including means to individually adjust the cutting height of each cutting unit.

15. The combination of claim 10 wherein at least two of the cutting units are disposed to cut in paths parallel and transverse to a centrally mounted cutting unit, the pivotable connection between the frame and the two transversely located units being configured to increase the cutting overlap with said centrally mounted cutting unit when the ground immediately below any transversely located cutting unit increases or decreases in elevation as compared to the ground immediately below the centrally located cutting unit.

16. In combination, a mower connected to a means for propelling said mower, mower control actuation means on said propelling means and mechanical power take-off means connecting the propelling means to the mower, the combination including, said mower including a frame, at least three cutting units pivotally connected to said frame, a fluid reservoir containing a fluid, said reservoir including at least one outlet in fluid communication with at least three feed lines, each of said feed lines being in fluid communication with a fluid pumping unit, each said pumping unit being connected to be driven by said power take-off means, each said driven fluid pumping units being in fluid communication with one of said feed lines, each of said pumping units having an outlet in fluid communication with a driven fluid motor, one said fluid motor being connected to rotate each of said cutting units, said mower control actuation means including separate means for actuating each driven fluid pumping unit, thereby allowing any one, any two or any three of said cutting units to cut simultaneously, each cutting unit including a fluid return line to receive said fluid from one of the cutting units and return said fluid to said reservoir., said mower control actuation means including means for raising said cutting units vertically out of cutting position, said raising means being connected to said frame and one of said cutting units, there being one raising unit for each cutting unit, thereby allowing any one, any two or any three of said cutting units to be raised out of cutting position, at least two of said cutting units being disposed to cut in paths parallel and transverse to a centrally mounted cutting unit, the pivotable connection between the frame and the two transversely located units being configured to increase the cutting overlap with said centrally mounted cutting unit when the ground immediately below any transversely located cutting unit increases or decreases in elevation as compared to the ground immediately below the centrally located cutting unit.

* * * * *